United States Patent Office 3,032,997
Patented May 8, 1962

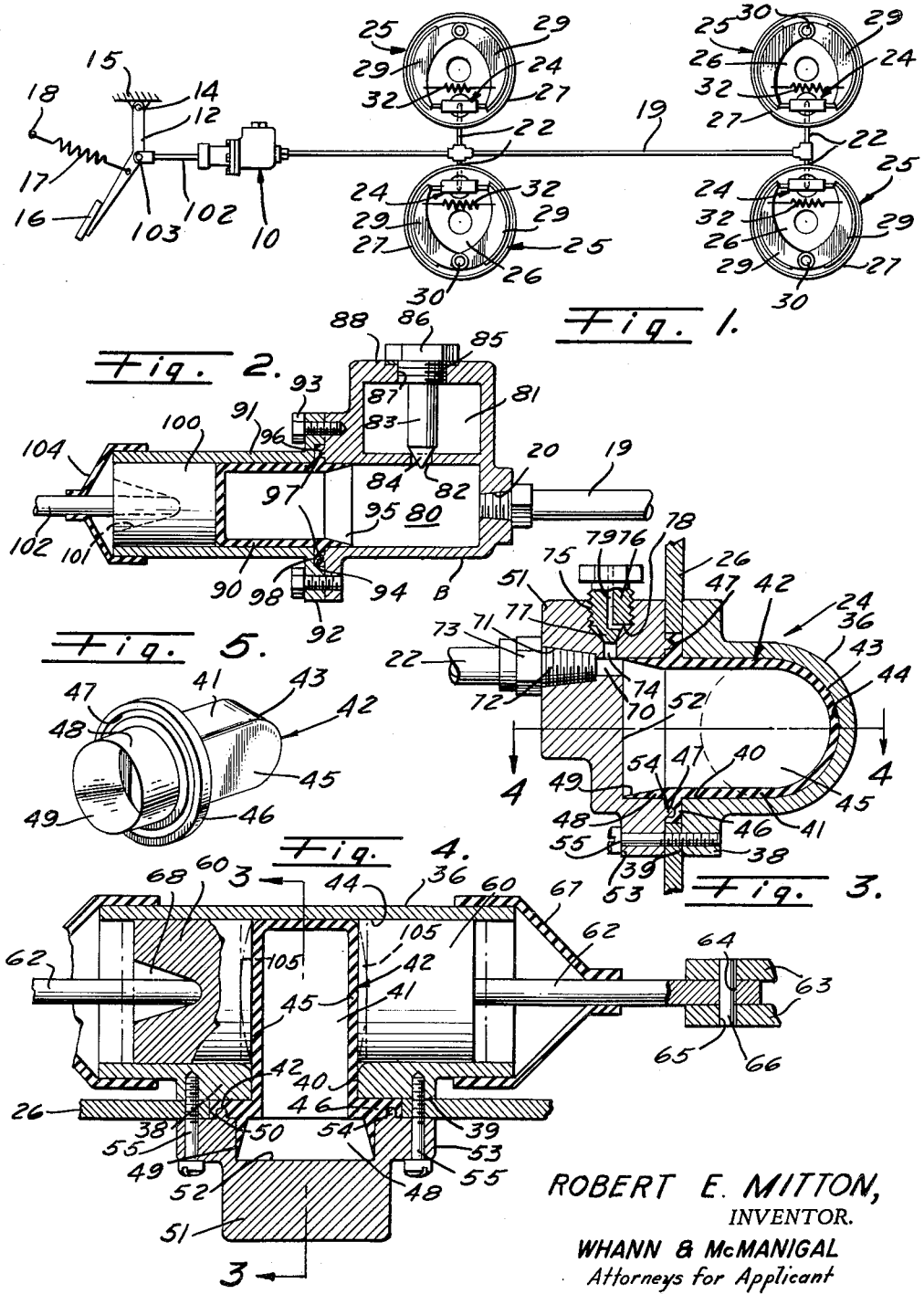

3,032,997
HYDRAULIC BRAKE SYSTEM
Robert E. Mitton, 416 Spreckles Bldg., San Diego 1, Calif., assignor, by mesne assignments, of twenty-two percent to Hydro-Ventricle Brake Co., a corporation of California, and small percentages to various assignees
Filed Dec. 14, 1959, Ser. No. 859,419
4 Claims. (Cl. 60—54.6)

This invention relates generally to hydraulic actuating devices and relates more particularly to hydraulic brake systems.

While the invention has particular utility in connection with hydraulic brake systems for motor vehicles, or the like, and is shown and described in such connection, it is to be understood that its utility is not limited thereto.

Various difficulties or problems are encountered in hydraulic brake systems of motor vehicles, such as, for example, leakage of the hydraulic fluid from the system due to wearing of the pistons and cylinders. Such pistons and cylinders in which they operate must have very close tolerances and after a period of time the parts wear sufficiently to permit the hydraulic fluid to escape.

It is therefore an object of the present invention to provide a hydraulic brake system and apparatus wherein the leakage problem is solved and leakage eliminated.

Another object of the invention is to provide a hydraulic system of this character wherein it is unnecessary to provide the extremely close tolerances required between moving parts in previous systems of which applicant is aware.

Still another object of the invention is to provide a hydraulic brake system wherein the brakes may be actuated with lighter pedal pressure.

A further object of the invention is to provide a system of this character utilizing elastic bulbs for operating the brake shoes, the elasticity of said bulbs serving to aid in the retraction of the parts of the system.

A still further object of the invention is to provide a system and apparatus of this character that is extremely simple in construction.

Another object of the invention is to provide a system of this character that is relatively inexpensive to manufacture.

Still another object of the invention is to provide a system of this character that is easy to service.

The characteristics and advantages of the invention are further sufficiently referred to in connection with the following detailed description of the accompanying drawings, which illustrate a system embodying the present invention. After considering this example, skilled persons will understand that many variations may be made without departing from the principles disclosed, and I contemplate the employment of any structures, or arrangements or modes of operation that are properly within the scope of the appended claims.

Referring to the drawings, which are for illustrative purposes only:

FIG. 1 is a schematic view of a fluid pressure braking system embodying the invention;

FIG. 2 is an enlarged, longitudinal section through the fluid pressure producing device or master cylinder of the system;

FIG. 3 is an enlarged cross-sectional view through one of the fluid pressure actuated brake motors taken on line 3—3 of FIG. 4;

FIG. 4 is a section view taken on line 4—4 of FIG. 3; and

FIG. 5 is a perspective view of a bulb for a fluid pressure actuated brake motor which actuates the brake shoes.

Referring more particularly to the drawings, there is shown a fluid pressure producing device 10, which may be termed a master cylinder, adapted to be actuated by a brake pedal lever 12 which is pivoted at 14 to any suitable fixed support 15, the pedal 16 being attached in the usual manner to the free end of the lever 12. A spring 17 has one end connected to the lever 12 and the other end connected to a fixed support 18, said spring being adapted to move the lever to its normal inoperative position in the usual manner.

A fluid pressure delivery pipe or conduit 19 has one end suitably connected to the discharge port 20, FIG. 2, of the fluid pressure producing device 10, branch conduits 22 lead from the delivery pipe or conduit 20 to the respective fluid pressure actuated motors, indicated generally at 24, shown as arranged in pairs, with one pair adapted to actuate the brakes associated with the front wheels of a motor vehicle and the other pair adapted to actuate the rear wheels of said vehicle.

The brakes, indicated generally at 25, may be of any conventional type with each including a fixed support or backing plate 26 adapted to be secured to an axle or to an axle housing. Each brake also includes a rotatable drum 27 secured to the backing plate and adapted to be secured to a wheel, and each brake also includes a pair of corresponding, interchangeable, oppositely arranged friction elements or shoes 29 pivoted at 30 to the backing plate for cooperation with the drum. A retractile spring 32 has its ends connected with respective shoes for urging the free ends of the shoes inwardly or away from the drums, as in the well known manner, there being a motor 24 positioned between the free ends of the shoes and connected thereto, as will be described more particularly hereinafter, for actuating said shoes.

Since the fluid pressure actuated motors 24 are all of the same construction, a description of one will suffice.

Each of said motors include the cylindrical body 36, which is open at the ends and which has an enlarged boss 38 with a flat side 39 receivable against the inner face of the backing plate 26. The boss 38 is provided with an opening 40 which extends into the interior of the cylinder 36 for reception of an expansible end 41 of a bulb, indicated generally at 42. The expansible end portion 41 of bulb 42 has a curved free end 43 which conforms to the curvature of the inner surface 44 of the cylinder 36, as best shown in FIG. 3. The end portion 41 of the bulb 42 has oppositely arranged flattened, parallel sides 45 which face the respective ends of the cylindrical body 36.

At the end of the expansible portion 41 of the bulb there is an annular radial flange 46 in the outer side of which there is an annular groove 47. At the outer side of the flange 46 there is an outwardly extending tubular skirt 48, the exterior of which is cylindrical. The interior of skirt 48 flares outwardly to a relatively sharp edge 49.

Flange 46 is received in an opening 50 in the backing plate 26 and the skirt 48 is received in a recess 52 in an attaching member 51 which has a flange 53 engageable with the outer side of the plate 26. The sides of the member 51, which engages the plate 26, is provided with an annular ridge 54 concentric with the axis of the skirt 48 and received in the groove 47 of the bulb flange 46. Screws 55 are received in aligned opening provided therefore in the flange 53, plate 26, and boss 38, respectively, whereby the parts of the device are secured together.

Slidable within the opposite end portion of the cylindrical body 36 are pistons 60, the inner ends of which engage the respective sides 45 of the bulb 42. Each piston 60 is provided with a connecting rod 62 which extends outwardly of the body 36 and is operably received between arms 63 at the free ends of the brake shoes 29. The rods 62 are provided with openings 64 which are in axial alignment with openings 65 in the respective arms 63 for reception of a pin 66 whereby the rods 62 are pivotally connected with the respective brake shoes 29. Dust caps 67 of known character are provided on the rods 62 and open ends of the cylindrical body 36 to keep out dust and other foreign matter from the moving parts of the motor. The inner ends of the rods 62 are operably disposed in outwardly flaring recesses 68 in the respective pistons 60, said recesses 68 permitting operable movement of the rods 62 when the mechanism is actuated.

Member 51 is provided with a passage 70 from the closed end of the recess 52 of said member, said passage communicating with a tapered tapped bore 71 in the outer side of the member 51 for threadable reception of an externally threaded tapered end portion 72 of a fixture 73 which provides a fluid connection between a conduit 22 and the respective bulb 42.

Extending upwardly from passage 70 is a passage 74 communicating with the lower end of an internally threaded enlarged bore 75 in which a bleed plug 76 is screwed. The inner end of the bleed plug is provided with a tapered valve element 77 which normally seats at the upper end of the passage 74 when the plug 76 is screwed into the valve closing position. The base of the valve element 77 is smaller in diameter than the adjacent end of the plug to thereby provide a small air passage 78 from which a bleed air passage 79 extends to the outer end of said plug 76 so that when the plug is unscrewed a limited amount of air, which may be contained within the respective motor 24, will escape to atmosphere by way of the passages 70 and 74, chamber 78, and bleed passage 79. Because of the inclined surface of the interior of the skirt 48, air in the system will tend to flow into the passages 70 and 74 and, hence, to atmosphere, as above described, when the valve 76 is open. As pointed out above, the passage 74 is sealed shut when the plug 76 is screwed into the valve closing position.

Pressure producing device 10 has a body B having therein a fluid pressure chamber 80 and a reservoir 81 disposed thereabove with a passage 82 connecting said reservoir and chamber. There is a valve 83 which extends downwardly in the reservoir 81 and is provided with a tapered tip 84 adapted to enter into the passage 82 and seat at the upper end thereof to provide a seal which prevents escape of fluid through the passage 82 from the chamber 80 when said valve 83 is in the closed position. At the upper end of the valve 83 there is an enlarged externally threaded part 85 and a head 86 at the outer end thereof whereby the valve may be screwed into the valve closing position and out of the valve closing position, as desired. The portion 85 is threadedly received in an internally threaded bore 87 in the upper wall 88 of reservoir 81.

At the end of chamber 80 opposite the outlet port 20 there is a bulb 90 of flexible, resilient material, such as synthetic rubber or the like, which is resistant to the effects of the hydraulic fluid used in hydraulic brake systems, and the like. The outer end portion of the bulb 90 is cylindrical and is received in the inner end portion of a tubular, cylindrical member 91, which has a flange 92 at one end and openings therein for reception of screws 93 which are screwed into aligned tapped openings in the body B, whereby the body and member 91 are secured together. Bulb 90 is provided with an outwardly extending annular flange 94 from which a skirt 95 extends into the adjacent end portion of the chamber 80, said skirt 95 being similar to the skirt 48 of the bulb 42. At the inner side of flange 94 there is an annular recess 96 concentric with the bulb 90 in which is received an annular ridge 97 of the adjacent end of the body B. It is to be noted that the flanged end of the member 91 is provided with an enlarged recess 98 in which the flange 94 is received and secured.

In the outer end portion of the member 91 is slidably disposed a piston 100 having an outwardly flared recess 101 in the outer end thereof for operable reception of the adjacent end of a connecting rod 102 which is pivotally connected at its opposite end to the pedal lever 12 intermediate the end thereof by means of a pivot 103 of any suitable well known type. A dust cap 104 is also provided for the outer end of the member 91 and has an opening provided for the rod 102.

Since the piston 60 and piston 100 do not have to hold pressure, the fitting of said pistons in their respective cylinders does not have to have the close tolerances of systems wherein the pistons must hold fluid pressure.

Assuming the system is completely filled with hydraulic liquid and the pedal 16 is actuated to move piston 100 inwardly against the bulb 90, the pressure will be transmitted through the bulb 90 to the fluid within the system and actuate the fluid pressure actuated motors 24. Such fluid pressure within the bulbs 42 of the motors 24 will cause the sides thereof 45 to move outwardly, as indicated at 105 in FIG. 4, to thereby force the pistons 60 outwardly and actuate the brake shoes 29 so that they will engage the drum 27 in the well known manner to effect braking action. Upon release of the pressure on the brake pedal 16 the springs 32, spring 17 and the resilience of the bulbs in the system will cause the parts to return to the normal brake releasing position.

Should it be desired to bleed the fluid pressure producing device 10 the screw 83 is loosened to permit the air in the chamber 80 to escape into the reservoir 81, whereupon the valve 83 may be screwed to the closed position.

It is to be noted that the skirts 48 and 90, because of the taper of the interior thereof to provide a relatively thin outer edge portion, will be pressed tightly into sealing engagement with the recesses 52, respectively, and the interior end portion of the chamber 80, when fluid pressure is developed in the system. This is an added sealing feature.

It is thought that the invention and many of its attendant advantages will be understood from the foregoing description and it is believed that it will be apparent that various changes may be made in the form, construction and arrangement of the parts of the invention without departing from the spirit and scope thereof or sacrificing all of its material advantages, the embodiment hereinbefore described being merely for the purpose of illustration.

I claim:

1. A bulb for a fluid pressure system, comprising: a hollow, resilient expansible portion having one end closed and the other end open and having oppositely arranged substantially parallel flat sides spaced apart from each other; an annular flange adjacent the open end of said expansible portion, said flange having an annular recess in the face opposite the expansible portion of the bulb; and a skirt extending from said flange in a direction opposite the expansible portion of the bulb, said skirt being tubular with the interior thereof flaring outwardly.

2. A fluid pressure actuated device, comprising: wall means defining a tubular cylinder open at the ends having an opening therethrough intermediate said ends; a bulb, including an expansible part extending into the cylinder through said opening in the wall thereof, said bulb being resilient and provided with oppositely arranged substantially parallel flat sides which are spaced apart from each other and which face the respective ends of the cylinder, one end of said bulb being open; an annular flange on said bulb adjacent the open end thereof; a tubular skirt extending from said flange oppositely from the expansible portion of the bulb, the interior of said skirt flaring outwardly, the exterior of said skirt being cylindrical; an attaching member for securing the cylinder to a support, said attaching member having a recess in which the skirt is received and a flow passage from said recess adapted to be connected to a source of fluid pressure, said passage being at the top of the recess when the device is in attached position, said member also having a bleed passage which extends upwardly from the first mentioned passage; a movable valve member movable from a position closing the upwardly extending passage to a position wherein said upwardly extending passage is open, said valve member having an air-escape passage for the escape of air from the upwardly extending passage to ambient atmosphere; and a piston slidably disposed in the respective end portions of the cylinder with the inner ends thereof operably engaging respective flat sides of said expansible portion of the bulb.

3. In a hydraulic brake system: fluid pressure producing means, including a resilient hollow bulb open at one end and closed at the other end; an annular flange adjacent the open end of said bulb, said flange having an annular recess facing in the same direction as the open end of said bulb; and a skirt extending from said flange in the same direction as the open end of the bulb, said skirt being tubular with the interior thereof flaring outwardly.

4. A bulb for a fluid pressure system, comprising: a hollow, resilient expansible portion having one end closed and the other end open and having oppositely arranged substantially parallel flat sides spaced apart from each other; a radial flange adjacent the open end of said expansible portion, said flange having an annular recess in one face thereof; and a skirt extending from said flange in a direction opposite the expansible portion of the bulb, said skirt being tubular with the interior thereof flaring outwardly.

References Cited in the file of this patent
UNITED STATES PATENTS

| | | |
|---|---|---|
| 1,857,413 | Tatter | May 10, 1932 |
| 2,178,490 | Nielson | Oct. 31, 1939 |
| 2,192,012 | La Brie | Feb. 27, 1940 |
| 2,911,004 | Whitten | Nov. 3, 1959 |